Nov. 26, 1963 M. MORET 3,112,416
HAND MOTOR WITH TOTALLY ENCLOSED STARTING CONTACTS
Filed Nov. 28, 1961 2 Sheets-Sheet 1

INVENTOR
Michel Moret
BY
ATTORNEYS

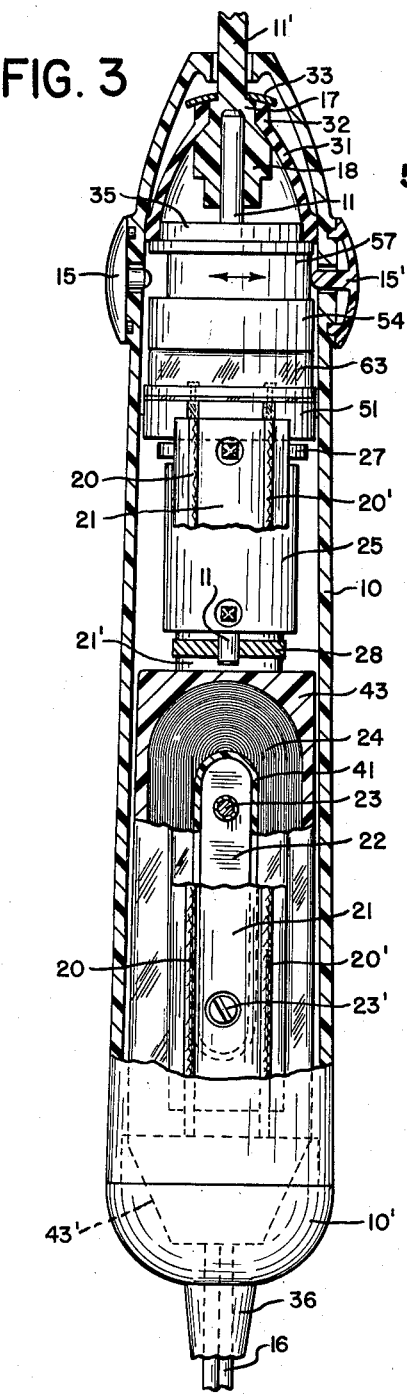
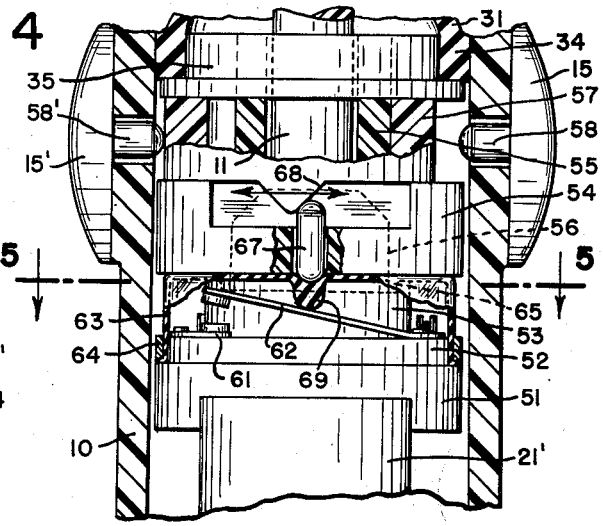
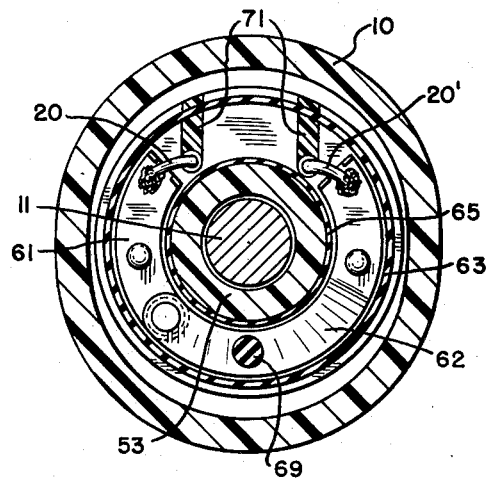

United States Patent Office 3,112,416
Patented Nov. 26, 1963

3,112,416
HAND MOTOR WITH TOTALLY ENCLOSED
STARTING CONTACTS
Michel Moret, Chene-Bougeries, Geneva, Switzerland, assignor to Etablissement Aesup, Vaduz, Liechtenstein, a firm of Liechtenstein
Filed Nov. 28, 1961, Ser. No. 155,366
Claims priority, application Switzerland Dec. 2, 1960
6 Claims. (Cl. 310—68)

This invention relates to electrically-operated hand appliances for corporal care, and particularly to electrically-operated toothbrushes. The invention is particularly directed to the provision of an electrically safe appliance of this character incorporating an electric switch therein.

Electrically-operated toothbrushes are now known including a casing forming a handle, a shaft extending through one end of the casing for carrying a toothbrush head, and electrical means mounted within the casing for oscillating the shaft. One particular type is disclosed in U.S. Patent 2,917,758, issued December 22, 1959 to Held et al. In this toothbrush the shaft is rotationally oscillated so as to impart a corresponding motion to a toothbrush head attached thereto and brush the teeth in the lengthwise direction thereof. Other types are known in which a longitudinal oscillation is imparted to the shaft.

By using different types of heads, the appliance can be used for other types of corporal care, such as massage, beauty treatment, etc.

When such appliances are arranged to be connected to an external power supply such as the power mains, it is highly important to provide complete protection against the danger of an electric shock. They are commonly employed in the bathroom where the appliance or the hands of the user may be wet, so that even small amounts of electrical leakage could be dangerous. In the case of a toothbrush, water and toothpaste are commonly used on the brush and, when inserted in the mouth, a fairly good electrically conducting path exists for any leakage current from the device.

With an oscillating shaft, it is difficult to achieve watertightness, while at the same time permitting oscillations of sufficient amplitude to be obtained with the limited power available. Further, even though initially obtained, over an extended period of use the watertightness may become impaired.

In devices of this type, an electric switch therein is convenient so that the device can be turned off without unplugging the cord from the electric outlet. Further, since it may be desired to start and stop the device during its use, as in applying toothpaste to the brush head, it is desirable for the switch actuating mechanism to be arranged for convenient action by the fingers with the device held in the hand in normal operating position.

However, since a switch inherently involves the making and breaking of an electric circuit, and hence movement of parts, great care must be exercised to preserve watertightness. Due to space limitations in a device of this type, switch watertightness is difficult to attain while at the same time preserving convenience of use.

In accordance with the present invention, a switch construction is provided in which the switch contacts are rendered watertight in a fitting mounted within the casing. A slider is mounted on the fitting for movement transversely of the casing. A pin mounted for longitudinal movement in the fitting is engaged by an inclined surface of the slider to move one switch contact relative to the other. A pair of resilient areas in the casing on opposite sides of the shaft near respective ends of the slider enable transverse movement of the slider in either direction by manual pressure on respective resilient areas, thereby enabling the switch contacts to be opened and closed. Advantageously the fitting is mounted in the casing between the motor or other electrical means for oscillating the shaft and the end of the casing through which the shaft extends.

Preferably the motor or other electrical driving means is of a type including an actuating coil which, when supplied with alternating current, will produce oscillation of the shaft without requiring the making and breaking of an electrical circuit during operation. Then, the actuating coil and the connections thereto are encapsulated in a waterproof insulating material. This encapsulation is similar to that described in copending application Serial No. 155,365, filed November 28, 1961 by Moret for "Electrically-Operated Hand Appliances for Corporal Care, Particularly Toothbrushes." Also, additional means are preferably provided for rendering the portion of the casing containing the switch fitting and the electrical driving means substantially watertight.

In accordance with the present invention, conductors connecting the switch in circuit with the power supply to the coil are insulated with waterproof insulation, and the coil ends thereof are encapsulated with the coil and the switch ends thereof sealed in the fitting.

By this construction a high degree of safety is obtained while at the same time providing for convenience in used.

The invention will be more fully understood from the following description of a specific embodiment thereof, taken in conjunction with the drawings, in which:

FIGS. 2 and 3 are longitudinal cross-sections through the handle, taken at right angles to each other;

FIG. 4 is a partial longitudinal section through the portion of the casing containing the switch mechanism; and FIG. 5 is a transverse cross-section taken along the line 5—5 of FIG. 4.

Figure 1:
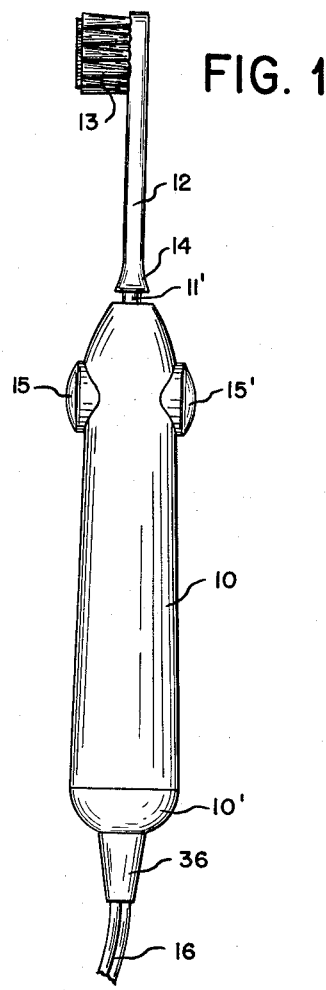
FIG. 1 is an overall view or an electrically-operated toothbrush including handle and attached stem-brush.

Referring to FIG. 1, a casing 10 forms a handle and shaft end 11′ projects from the front end thereof. In this embodiment the brush head is detachable from the handle and comprises a stem 12 with bristles 13 mounted thereon, with a coupling at 14 enabling the brush-stem to be conveniently attached and removed. The coupling may be of the type described in application Serial No. 103,482, filed April 17, 1961 by Moret for "Toothbrush Attachment."

The handle is preferably of an insulating material such as a plastic, and resilient buttons 15, 15′ are provided to enable actuation of the slider of the switch mechanism. Alternating current from an external power supply is supplied through an insulated multiple-conductor electric cord 16 extending through the end cap 10′ of the casing in watertight relationship therewith.

Figure 2:
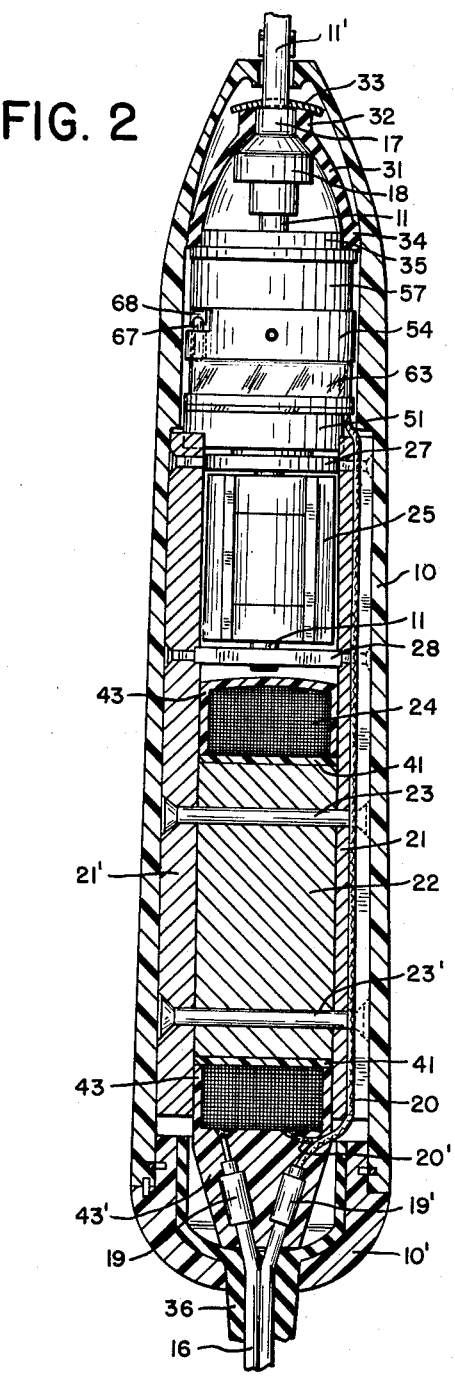

Referring to FIGS. 2 and 3, the electrical means for oscillating shaft 11 is here shown as similar to the motor of the aforesaid Patent 2,917,758. The motor has an electromagnetic stator structure including longitudinally extending pole pieces 21, 21′ connected at the rear ends thereof by a transverse section 22 of magnetic material, and suitably held together as by rivets 23, 23′. Encircling transverse member 22 is a coil 24. One end of the coil is connected to the inner end 19 of one of the conductors of the electric cord 16. The other cord conductor 19′ is connected to a conductor 20 leading to the switch, and return conductor 20′ from the switch is connected to the other end of the coil.

A rotor 25 is located between the front ends of pole pieces 21, 21′ and is mounted on a shaft 11 rotatably mounted in bearing plates 27 and 28 attached to the pole pieces. The rotor 25 has a permanent magnet forming part thereof which interacts with the alternating magnetic flux between the adjacent portions of pole pieces 21, 21' to produce rotational oscillation. Spring biasing means (not shown) urge the rotor to a given position with respect to the stator, the rotor oscillating about this position in operation.

This type of motor is explained in detail in the aforesaid patent and further explanation here is unnecessary.

To prevent the entry of water, etc., into the portion of the casing containing the motor, a flaring sleeve 31 of flexible, water-impermeable material such as neoprene is provided. The front end 32 thereof encircles an enlarged section 17 of shaft end 11', and the unstretched diameter of the sleeve is made smaller than the diameter of 17 so that the elasticity produces a tight fit and insures watertightness. Section 18 of the shaft end may be somewhat larger so as to provide an abutment for end 32 of the sleeve and a thin washer 33 of a locking type may be placed over shaft end 11' to hold end 32 firmly abutted against section 18. As shown in FIG. 3, shaft end 11' is a molded section fitting over and attached to shaft 11, which may be of steel.

The rear end 34 of the sleeve is held tightly against the inside of the casing by a ring 35 forming a part of the switch fitting as described hereinafter.

It is thus seen that sleeve 31 prevents entry of water to the rearward portion of the casing 10 where the motor is located. In operation, the front end 32 of the sleeve twists with respect to the rear end 34, the flexibility of the sleeve allowing this action to take place without impairing the watertight connections with shaft and casing.

The rearward portion of the casing is constructed so as to be watertight. To this end, casing 10 is advantageously made in one piece of an insulating plastic, with the resilient buttons 15, 15' either integral with the casing or firmly adhered thereto. In order to permit assembly, cap 10, is formed separately and then, after assembly, joined watertight to the rest of the casing by an adhesive, or by fusing, etc. A molded plastic insert 36 is employed to insure watertightness where the cord 16 passes through cap 10', and to provide additional strength against breaking the cord in normal use.

Although this construction has been found highly effective in obtaining watertightness, defects in manufacture, wear during use, eventual deterioration of the sleeve 31, etc. could result in impairment of the protection against electric shock. Accordingly, the coil 24 and the insulation of the cord and switch conductors adjacent thereto are encapsulated in a waterproof insulating material, for example a suitable plastic.

As shown in FIGS. 2 and 3, coil 24 is formed around an elongated tube 41 of waterproof insulating material. Nylon has been employed with success. The cross-section of the elongated tube is shaped to accommodate the transverse member 22 which forms part of the magnetic circuit. The coil is then embedded in an insulating waterproof plastic 43 which extends at 43' over the adjacent ends 19, 19' of the insulation of electric cord 16, and the adjacent ends of the insulated switch conductors 20, 20', and firmly adheres thereto. The encapsulation may be accomplished by molding with an epoxy resin.

Switch conductors 20, 20' are positioned in slots in pole piece 21 so that they are confined in the slots by the adjacent portion of casing 10 when the toothbrush is assembled. They lead to switch contacts mounted in a fitting near the buttons 15, 15'.

Referring to FIG. 4, the fitting has several sections of different diameter and may conveniently be molded of a suitable insulating plastic. Beginning at the rear, the fitting has fixed sections including an annular section 51, a slightly stepped-back section 52, a further stepped-back section 53, a larger diameter section 54, a tubular section 55, and ring 35 mentioned before. Dotted line 56 indicates a joint between two separate moldings for convenience in assembly. A slider 57 is mounted between sections 54 and 35 for movement transversely of the casing. To this end, the slider has an opening therein which encircles fixed section 55, and the opening is elongated so that the slider can be moved transversely. In FIG. 4 the slider is shown in its left-hand position.

The sections of the fitting may be separately molded, or two or more molded in one piece, and then joined to form a unit as best meets manufacturing convenience. An axial hole through all sections of the fitting allows the shaft 11 to pass therethrough.

The ends of the slider are adjacent portions 58, 58' of resilient buttons 15, 15'. In the position shown, pressure on button 15 will move the slider to the right, and when in the latter position pressure on button 15' will move it to the left.

To allow for convenient assembly of the toothbrush, the rear section 51 of the fitting is attached to the front ends of pole pieces 21, 21'.

Mounted on section 52 are switch contacts 61 and 62. The latter is of spring material urging it to the open position shown. Switch conductors 20, 20' are connected to switch contacts 61 and 62, as indicated in FIG. 5.

To provide for watertightness, the annular compartment containing the switch contacts 61 and 62 is encased in a flexible waterproof elastic covering 63. This is a cup-shaped covering secured at its rear end to fitting section 52 by a ring 64 which holds it tightly thereagainst. The front end extends over the front surface of fitting section 53 and is held in watertight engagement therewith. Advantageously, an annular slot 65 is provided in the front surface of section 53 and a molded ring forming part of the elastic covering 63 is pressed into the slot to insure watertightness.

A pin 67 is mounted for movement in a longitudinally-extending hole in fitting section 54 adjacent the annular switch compartment. The front end of the pin is engaged by an inclined surface 68 of slider 57. In FIG. 4 the pin is in its forward position, and movement of the slider to the right will move pin 67 to its rearward position.

The rear end of pin 67 engages a point on the upper annular surface of the waterproof elastic covering 63, in position to press switch contact 62 against switch contact 61 when in its rearward position. A projection 69 is formed as part of the covering 63 to transmit the pin movement to switch contact member 62, and take care of wear.

As specifically shown, the transverse movement of slider 57 is such that, when moved to the right from the position shown in FIG. 4 to close switch contacts 61 and 62, the rounded bottom of inclined surface 68 engages the top of pin 67. This, together with the friction between slider 57 and the adjacent surfaces of section 54 and ring 35 of the fitting, prevents the resilience of the spring contact 62 and the elastic covering 63 from opening the switch until button 15 is manually depressed to move the slider back to the left position shown. Thus, the switch remains open or closed until the slider is manually actuated to its opposite position, to promote convenience in use.

As shown in FIG. 5 sealing material 71 is applied at the points where the switch conductors 20, 20' enter the compartment containing the switch contacts, to insure watertightness at the points of entry.

It will therefore be seen that the portion of the switch fitting which contains the switch contacts is made watertight separately of the remainder of the casing 10. Thus, if at any time sleeve 31 should fail to preserve complete watertightness, the watertight construction of the switch will prevent electrical leakage and consequent danger of shock. Further, with the coil individually encapsulated, the watertightness of that portion of the electrical circuit is assured. Thus a high degree of protection against the danger of electrical leakage is obtained. In addition, the transversely moving slide and longitudinally moving pin permit convenient operation of the switch by the user while at the same time permitting the switch mechanism to occupy only a small volume, hence permitting a casing of suitably small size to be employed.

It will be understood that changes in details of construction, and in the manner in which the switch contact compartment is made watertight, may be made within the spirit and scope of the invention.

I claim:
1. An electrically-operated hand appliance for corporal care which comprises
   (a) an elongated casing forming a handle,
   (b) a shaft extending through one end of the casing for carrying an appliance head,
   (c) electrical means mounted within the casing for oscillating the shaft,
   (d) means for supplying electric power to said electrical means,
   (e) a fitting fixedly mounted in the casing,
   (f) a slider mounted on said fitting for movement transversely of the casing and having a surface inclined to the direction of movement thereof,
   (g) a pair of resilient areas on opposite sides of the casing near respective ends of the slider enabling transverse movement of the slider in either direction by manual pressure on respective resilient areas,
   (h) a pair of cooperating switch contact members mounted on the fitting and connected in the power supply circuit to said electrical means,
   (i) a pin monuted in a longitudinally extending hole in said fitting,
   (j) said pin being longitudinally movable by the inclined surface of the slider to move one switch contact member relative to the other,
   (k) and means for rendering the portion of the fitting containing the switch contact members substantially watertight.

2. An electrically-operated hand appliance for corporal care which comprises
   (a) an elongated casing of insulating material forming a handle,
   (b) a shaft extending through one end of the casing for carrying an appliance head,
   (c) electrical means mounted within the casing for oscillating the shaft,
   (d) means for supplying electric power to said electrical means,
   (e) a fitting fixedly mounted in the casing between the electrical means and said one end of the casing and having an axial opening therein through which the shaft extends,
   (f) a slider mounted on said fitting for movement transversely of the casing and having a surface inclined to the direction of movement thereof,
   (g) a pair of resilient areas in the casing on opposite sides of the shaft near the ends of the slider enabling transverse movement of the slider in either direction by manual pressure on respective resilient areas,
   (h) a pair of cooperating switch contact members mounted on the fitting and connected in the power supply circuit to said electrical means,
   (i) a pin mounted in a longitudinally extending hole in said fitting,
   (j) said pin being longitudinally movable by the inclined surface of the slider to move one switch contact member relative to the other,
   (k) and means for rendering the portion of the fitting containing the switch contact members substantially watertight.

3. Apparatus in accordance with claim 2 in which the last-mentioned means comprises a covering of water-impermeable flexible material extending over the switch contact members and attached to the fitting to form a water-tight compartment enclosing the switch contact members, said pin engaging the flexible covering outside of the compartment in position to deform the covering and move one switch contact member therein.

4. An electrically-operated toothbrush which comprises
   (a) an elongated casing of insulating material forming a handle,
   (b) a shaft extending through one end of the casing for carrying a toothbrush head,
   (c) an electric motor mounted within the casing for rotationally oscillating the shaft,
   (d) said motor having an electromagnetic stator structure including an actuating coil and being adapted to produce rotational oscillation of the shaft when alternating current is supplied to the coil,
   (e) a fitting fixedly mounted in the casing between the motor and said one end of the casing and having an axial opening therein through which the shaft extends,
   (f) a slider mounted on the fitting for movement transversely of the casing and having a surface inclined to the direction of movement thereof,
   (g) a pair of resilient areas in the casing on opposite sides of the shaft near the ends of the slider enabling transverse movement of the slider in either direction by manual pressure on respective resilient areas,
   (h) a pair of cooperating switch contact members mounted on the fitting between the shaft and the casing,
   (i) a two-conductor electric cord extending through the wall of the casing in substantially watertight relationship,
   (j) a fixed connection from one cord conductor to the coil,
   (k) a pair of insulated conductors extending from the coil to the switch with the coil ends thereof fixedly connected respectively to the coil and the other cord conductor and the switch ends thereof fixedly connected to the respective switch contact members,
   (l) said coil and the adjacent ends of the cord and switch conductors being encapsulated in a waterproof insulating material and the switch ends of the switch conductors being sealed in said fitting,
   (m) a pin mounted in a longitudinally extending hole in said fitting,
   (n) said pin being longitudinally movable by the inclined surface of the slider to move one switch contact member relative to the other,
   (o) and means for rendering the portion of the fitting containing the switch contact members substantially watertight.

5. Apparatus in accordance with claim 4 in which the last-mentioned means comprises a covering of water-impermeable flexible material extending over the switch contact members and attached to the fitting to form a watertight compartment enclosing the switch contact members, said pin engaging the flexible covering outside of the compartment in position to deform the covering and move one switch contact member therein.

6. An electrically-operated hand appliance for corporal care which comprises
   (a) an elongated casing forming a handle,
   (b) a shaft extending through one end of the casing for carrying an appliance head,
   (c) electrical means mounted within the casing for oscillating the shaft,
   (d) means for supplying electric power to said electrical means,
   (e) a fitting fixedly mounted in the casing,
   (f) a slider mounted on said fitting for movement transversely of the casing and having a surface inclined to the direction of movement thereof,
   (g) at least one resilient area on said casing near an end of the slider for enabling transverse movement of the slider by manual pressure thereon,
   (h) a pair of cooperating switch contact members mounted on the fitting and connected in the power supply circuit to said electrical means, (i) a pin mounted in a longitudinally extending hole in said fitting,
(j) said pin being longitudinally movable by the inclined surface of the slider to move one switch contact member relative to the other,
(k) and means for rendering the portion of the fitting containing the switch contact members substantially watertight.

References Cited in the file of this patent

UNITED STATES PATENTS

| | | |
|---|---|---|
| 666,956 | Dickerson | Jan. 29, 1901 |
| 1,911,444 | Fator | May 30, 1933 |
| 1,956,373 | Critchfield | Apr. 24, 1934 |
| 2,047,165 | Connolly | July 7, 1936 |
| 2,917,758 | Held et al. | Dec. 29, 1959 |